(12) United States Patent
Prima

(10) Patent No.: US 11,458,926 B2
(45) Date of Patent: Oct. 4, 2022

(54) GAS GENERATOR

(71) Applicant: Autoliv Development AB, Vargarda (SE)

(72) Inventor: Gerald Prima, Landrevarzec (FR)

(73) Assignee: Autoliv Development AB, Vargarda (SE)

(*) Notice: Subject to any disclaimer, the term of this patent is extended or adjusted under 35 U.S.C. 154(b) by 0 days.

(21) Appl. No.: 16/310,191

(22) PCT Filed: Jun. 28, 2017

(86) PCT No.: PCT/EP2017/066046
§ 371 (c)(1),
(2) Date: Dec. 14, 2018

(87) PCT Pub. No.: WO2018/002166
PCT Pub. Date: Jan. 4, 2018

(65) Prior Publication Data
US 2019/0184931 A1    Jun. 20, 2019

(30) Foreign Application Priority Data
Jun. 29, 2016  (FR) ...................................... 1656107

(51) Int. Cl.
*B60R 21/264* (2006.01)
*F42B 3/04* (2006.01)
(Continued)

(52) U.S. Cl.
CPC .............. *B60R 21/264* (2013.01); *F42B 3/04* (2013.01); *B60R 2021/26011* (2013.01); *B60R 2021/2612* (2013.01); *B60R 2021/26076* (2013.01)

(58) Field of Classification Search
CPC ......... B60R 21/264; B60R 2021/26011; B60R 2021/26076; B60R 2021/2612;
(Continued)

(56) References Cited

U.S. PATENT DOCUMENTS 5,139,280 A    8/1992   Cord et al.
5,590,905 A    1/1997   Cuevas
(Continued)

FOREIGN PATENT DOCUMENTS

EP    0407248 A1    1/1991
EP    0407248 A1    1/1991
(Continued)

OTHER PUBLICATIONS

International Search Report for PCT/EP2017/066046, ISA/EP, Rijswijk, NL, dated Sep. 12, 2017.

*Primary Examiner* — Joshua E Freeman
*Assistant Examiner* — Benjamin S Gomberg
(74) *Attorney, Agent, or Firm* — Harness, Dickey & Pierce, P.L.C.

(57) ABSTRACT

A disc-shaped pyrotechnic gas generator includes a housing with a plurality of diffusion holes. A pyrotechnic substance is arranged in the housing. A filter is arranged in the housing. A containment member is arranged in the housing between the pyrotechnic substance and the filter. A drainage member is arranged in the housing between the pyrotechnic substance and the containment member. The filter is to provide support to a supported portion of the containment member at a start of operation of the gas generator.

16 Claims, 2 Drawing Sheets

Figure 1:
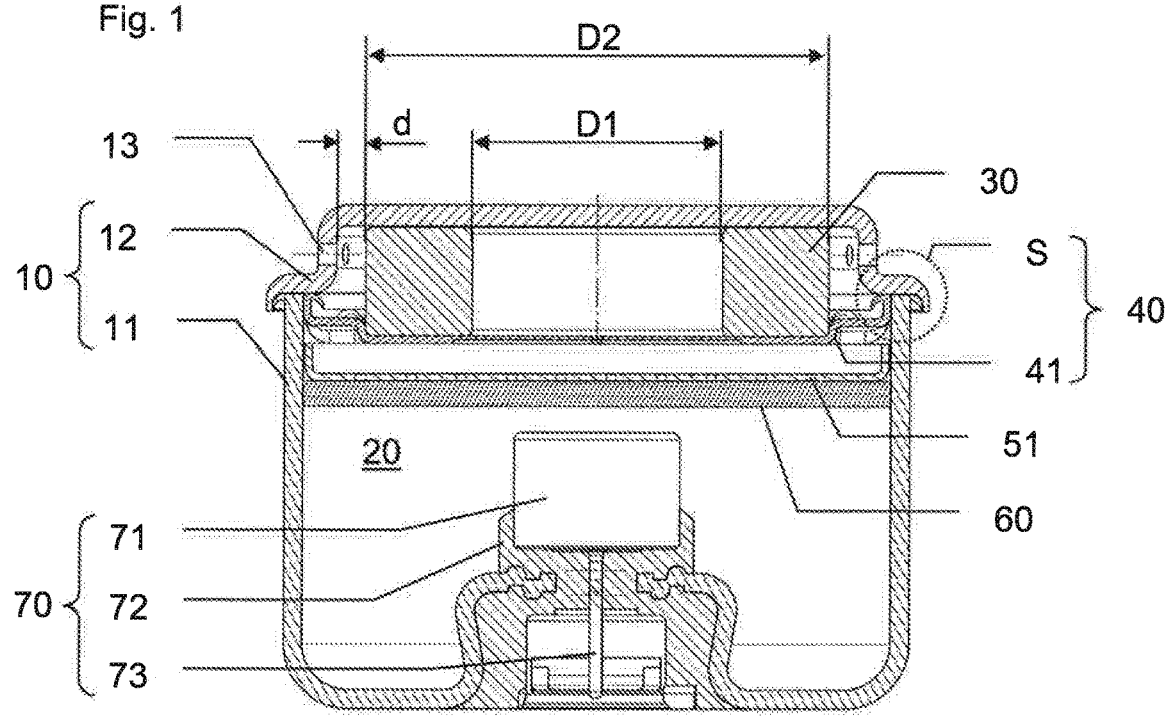

(51) Int. Cl.
*B60R 21/26* (2011.01)
*B60R 21/261* (2011.01)

(58) Field of Classification Search
CPC ....... B60R 21/261; B60R 21/262; F42B 3/00;
F42B 3/02; F42B 3/04
USPC ........................................................ 102/530
See application file for complete search history.

(56) References Cited

U.S. PATENT DOCUMENTS

| | | | |
|---|---|---|---|
| 5,844,164 A * | 12/1998 | Cabrera | ................ B60R 21/261 |
| | | | 102/288 |
| 7,806,954 B2 * | 10/2010 | Quioc | ................ B60R 21/2644 |
| | | | 55/385.3 |
| 8,662,532 B2 * | 3/2014 | Parks | ...................... B60R 21/26 |
| | | | 102/530 |
| 8,708,368 B2 * | 4/2014 | Ukita | ...................... B60R 21/26 |
| | | | 280/741 |
| 2017/0136984 A1 | 5/2017 | Louboutin | |
| 2018/0304848 A1 * | 10/2018 | Imai | .................... B60R 21/2644 |

FOREIGN PATENT DOCUMENTS

| | | |
|---|---|---|
| EP | 2195206 A2 | 6/2010 |
| EP | 2195206 A2 | 6/2010 |
| EP | 2195206 B1 | 6/2011 |
| EP | 2195206 B1 | 6/2011 |
| WO | 2009/043904 A2 | 4/2009 |
| WO | 2015/144634 A2 | 10/2015 |
| WO | WO-2015/144634 A2 | 10/2015 |

* cited by examiner

GAS GENERATOR

CROSS-REFERENCE TO RELATED APPLICATIONS

This application is a 371 U.S. National Stage of International Application No. PCT/EP2017/066046, filed Jun. 28, 2017, which claims priority to French Patent Application No. 1656107, filed Jun. 29, 2016. The disclosures of the above applications are incorporated herein by reference.

FIELD

In general, this invention concerns a gas generator intended to provide inflator gases for a passive automotive safety device, such as an airbag. In particular, the invention concerns a pyrotechnic gas generator in which the inflator gases are generated through the combustion of propellant, and which features a disc-shaped housing to hold the propellant or the pyrotechnic substance in the form of loose tablets.

BACKGROUND

Disc-shaped gas generators are known from prior art, such as the one disclosed in Document EP2195206 A2. In contrast, the gas generator presented in this document features, in particular, an internal structure with a thick plate forming a combustion chamber wall which must be able to withstand a high pressure in operation, which increases the cost and the weight on board the vehicle. In fact, the thick plate presented in this document holds the nozzles (the smallest section generator gases flow through, which defines the combustion pressure of the pyrotechnic substance—the highest pressure throughout the generator) and must therefore withstand this combustion pressure. When also considering the diffuser made from thick metal sheet and crimped onto the gas generator presented in this document, one notes that the weight and cost are significant.

SUMMARY

One aim of this invention is to address the disadvantages found in documents of prior art mentioned above and in particular, firstly, to propose a pyrotechnic gas generator featuring a simple internal structure without bulky parts, while also offering a reliable operating mode and a fast manufacturing process without complex steps.

For this purpose, a first aspect of the invention concerns a disc-shaped pyrotechnic gas generator, including:
housing with diffusion holes,
a pyrotechnic substance arranged in the housing,
means of filtration arranged in the housing,
means of containment arranged in the housing between the pyrotechnic substance and the means of filtration,
means of drainage arranged in the housing between the pyrotechnic substance and the means of containment,
characterized in that the means of filtration are arranged in order to provide support to a supported portion of the means of containment at least at the start of the gas generator's operation. The generator, according to this implementation, is arranged in such a way that the means of containment are directly supported by the means of filtration, so that no other support is necessary, which makes the gas generator's internal structure simpler and lighter. In fact, the functions of the means of containment are only to ensure the leak-proof nature of the pyrotechnic substance and its release at a predetermined pressure on ignition of the generator. As such, the thickness of the means of containment can be reduced without impairing their opening pressure because they are supported by the means of filtration. In other words, the means of filtration ensure the controlled deformation and opening of the means of containment by preventing the latter from collapsing, thanks to the support provided by the means of filtration. Finally, support is provided at least at the start of the operation, i.e. between the point when the internal pressure within the pyrotechnic substance begins to increase following ignition, and a point when the means of containment open or are unsealed.

In other words:
the means of containment can reach a predetermined unsealing/puncturing pressure which could not be reached without this support,
the means of containment can reach a predetermined unsealing/puncturing pressure higher than the unsealing/puncturing pressure that could be reached without this support (the means of filtration "reduce" the surface on which pressure is applied),
the means of containment are configured in such a way that they can only reach a puncturing pressure in the presence of the means of filtration.

Advantageously, the means of containment include at least one seal ensuring the leak-proof nature of the chamber containing the pyrotechnic substance before ignition of the gas generator, and which ruptures at a pressure high enough to guarantee the sufficient initial ignition of the pyrotechnic substance for complete combustion in accordance with the operating time.

Advantageously, the pyrotechnic substance is a loose load of tablets.

Advantageously, the pyrotechnic substance is a loose load of tablets around an ignition device of the gas generator. This helps improve the ignition of the pyrotechnic substance and makes the gas generator more compact, in particular axially. This axial compactness is particularly sought after for front, driver and passenger airbags.

Advantageously, the support provided to the means of containment by the means of filtration allow the rupture of a non-supported portion of the means of containment at the start of the gas generator's operation, and this rupture is controlled and repeatable, because the dimension of the non-supported part is dictated by the dimensions of the means of filtration which act as support.

Advantageously, the means of filtration provide support in the form of a crown to the means of containment, so as to establish a non-supported portion of the means of containment in the form of a disc. Such a non-supported portion in the form of a disc offers a repeatable pressure and repeatable mode of rupture.

Advantageously, the non-supported portion of the means of containment is opposite a void left by the means of filtration.

Advantageously, the non-supported portion is configured to rupture by forming petals in the space left by the means of filtration. When they rupture, the means of containment form petals that remain attached to the supported portion of the means of containment. No free debris is therefore produced, which guarantees that no components are ejected towards the safety device.

Advantageously, the means of filtration are a filter in the form of a hollow cylinder.

Advantageously, the means of containment are connected to the housing in a leak-proof manner.

Advantageously, the means of containment have a thickness within a range from 0.4 to 1 mm, and preferentially within a range from 0.4 to 0.9 mm, with for example at least a marked portion notably cross-shaped with a remaining thickness equal to 0.3±0.05 mm. The following mechanical characteristics can be envisaged: breaking strength (Rm) within a range from 300 MPa to 800 MPa, and/or elongation at break (A %) greater than or equal to 16%, and/or an elastic strength (Re) greater than or equal to 420 MPa. An alloy of the type S420MC (1.0980) (standard EN 10149-2-1996) can be envisaged. Consequently, the rupture of such means of containment occurs between 1 ms and 6 ms after ignition of the ignition device. It should be noted that such means of containment cannot open in a repeatable manner if the means of filtration do not establish a support on which the means of containment are coupled in order to open.

Advantageously, the means of containment have a thickness less than 60% of a thickness of the housing, and in particular the means of containment have a thickness less than 60% of a thickness of the part defining the nozzles.

Advantageously, the means of containment have an external dimension greater than or equal to an external dimension of the means of filtration. It should be noted that such sizable means of containment cannot open in a repeatable manner if the means of filtration do not establish a support on which the means of containment are coupled in order to open.

Advantageously, at least one surface of the means of filtration is supported by a wall of the housing.

Advantageously, the surface of the means of filtration supported by the housing is opposite a surface of the means of filtration providing support to the means of containment. The means of filtration therefore have a function as a mechanical bridge between the means of containment and the housing. In other words, the means of filtration are directly supported by the housing, which avoids the need to give them increased rigidity to take up the forces for supporting the means of containment.

Advantageously, the means of containment includes means of positioning, such as a rib allowing a space to be established between a downstream surface (or opposite the diffusion holes) of the means of filtration and a housing wall penetrated by the diffusion holes. The filter is therefore positioned by means of a rib to ensure that there is always a space between the filter and the wall of the diffuser, to help the diffusion gases to circulate correctly.

Advantageously, the diffusion holes form nozzles controlling the combustion of the pyrotechnic substance. The generator according to this implementation does not include an internal control nozzle. The combustion of the pyrotechnic substance is controlled by the diffusion holes, which means that the entire internal enclosure is uniformly pressurized: there is no need for a bulky internal part to withstand a certain pressure. This serves to ensure the satisfactory ignition of the pyrotechnic substance while keeping the means of filtration inside the combustion chamber, in areas with low gas speeds, which optimizes the capture of particles produced by combustion.

Advantageously, each diffusion hole has a diffusion surface of less than 2.3 mm$^2$. Furthermore, the leak-proof nature of the gas generator is not achieved with a seal on the diffusion holes, which helps reduce their size (without as a result impacting the unsealing pressure) to reduce the aggressivity of the diffusion gas jets on the airbag or air cushion.

Advantageously, a space is established between the means of filtration and the diffusion holes. Such a space ensures that the diffusion holes are not obstructed, which avoids any disturbance to the diffusion flows. The gas generator therefore easily complies with the test that consists of igniting the gas generator alone on a flat surface and in which movement must remain under 5 m, for example. Furthermore, the inflation of the safety device complies with the specifications, because the diffusion holes are not obstructed and all deliver the same quantity of gas.

Advantageously, the space is established between a downstream surface of the means of filtration and a wall of the housing penetrated by the diffusion holes and has a thickness in the area of the diffusion holes of at least 1 mm.

Advantageously, the housing includes:
a base holding the pyrotechnic substance and
a diffuser with the diffusion holes, welded onto the base, and
the means of containment are welded onto the housing.
Such an assembly method helps ensure a highly leak-proof seal.

Advantageously, the base is inertially welded onto the diffuser, and the means of containment include means of indexing which rotate in relation to the base (or the diffuser), so that they are inertially welded to the diffuser (or the base) at the same time as the inertia welding of the base onto the top piece. According to this implementation, the means of containment are indexed to one of the two other parts (either the base or the diffuser), to be set in motion by the latter part during friction welding, which serves to friction weld it onto the other part at the same time. The indexing interface is intended to provide removable or reversible indexing between the means of containment and either the base or the diffuser, prior to the friction welding step. In other words, the means of containment need to be indexed (for example, by freely or forcefully interlocking, freely or forcefully inserting, snapping into place) on or in the base (or the diffuser) to produce an intermediate subassembly during manufacturing, just before friction welding onto the diffuser (or the base). Consequently, it is understood that it is possible during the welding step to only require gripping tools for the base and diffuser, as the means of containment are indexed by either the base or the diffuser. Manufacturing is therefore simpler and faster, and requires less investment.

Advantageously, the means of containment include a metal disc and an O-ring arranged to form a leak-proof seal between the metal disc and the housing. Such an implementation is low cost.

Advantageously, the gas generator includes an ignition device, and pyrotechnic substance is arranged opposite a lateral surface of the ignition device. This makes the gas generator more compact and improves the ignition of the pyrotechnic substance by the ignition device.

Advantageously, the gas generator includes an ignition device, and pyrotechnic substance is arranged opposite a lateral surface of the ignition device, and opposite one end of the ignition device.

Advantageously, pyrotechnic substance is in contact with the ignition device. There is therefore no barrier or part to be provided between the pyrotechnic substance (loose propellant tablets) and the ignition device, which makes manufacturing easier.

Advantageously, the pyrotechnic substance is separated from the containment element. The means of drainage are inserted between the pyrotechnic substance and the means of containment.

Advantageously, the means of filtration feature a central recess, and the housing and/or the means of containment feature(s) a centering protrusion that fits with the central recess.

Alternatively, the means of filtration have exterior dimensions as an external diameter, and the housing and/or the means of containment feature(s) a centering receptacle into which the means of filtration fit. This helps ensure the space between the means of filtration and the diffusion holes, avoiding any movement of the means of filtration during assembly of the gas generator, and limits any deformation of the means of filtration during operation (with such deformation having the potential to impact the pressures inside the gas generator).

Advantageously, the pyrotechnic substance is a propellant, the means of filtration are a filter, the means of containment are a seal, the means of drainage are a hollowed-out or porous component which is highly permeable to air.

In other words, the invention concerns a disc-shaped pyrotechnic gas generator, including:
housing with diffusion holes,
a pyrotechnic substance arranged in the housing,
a filter arranged in the housing,
a seal, arranged in the housing between the pyrotechnic substance and the filter,
a hollowed-out or porous component arranged in the housing between the pyrotechnic substance and the seal,
characterized in that the filter is arranged in order to provide support to a supported portion of the seal at the start of the gas generator's operation.

In other words, the invention concerns a disc-shaped pyrotechnic gas generator, including:
housing with diffusion holes,
a pyrotechnic substance arranged in the housing,
means of filtration arranged in the housing,
means of containment, arranged in the housing between the pyrotechnic substance and the means of filtration,
means of drainage arranged in the housing between the pyrotechnic substance and the means of containment,
characterized in that the means of filtration are arranged in order to provide support to a supported portion of the means of containment at the start of the gas generator's operation, in which a combustion pressure noted $P_{comb}$ measured upstream of the means of drainage and a diffusion pressure noted $P_{diff}$ measured downstream of the means of drainage respect the following ratio:

$$P_{comb}/P_{diff} < 1.5.$$

In particular, the combustion pressure $P_{comb}$ is measured within a loose load of pyrotechnic substance, and the diffusion pressure $P_{diff}$ is measured at an internal diameter of the means of filtration.

Advantageously, the pyrotechnic substance is a loose load of pyrotechnic substance contained in a base with internal diameter Dp, and a ratio between a height Hp of the load of pyrotechnic substance and the diameter Dp verifying:

$$Hp/Dp < 0.75.$$

This implementation helps ensure the correct evacuation of combustion gases, and a uniform combustion within the load of pyrotechnic substance.

Advantageously, the means of filtration are a filter with an internal diameter D1 and a height Hf, and a ratio between the internal diameter D1 and a diameter Dp of the load of pyrotechnic substance verifying:

$$D1/Dp > 0.3 \text{ and/or}$$

$$Hf/Hp > 0.25.$$

This implementation helps ensure the correct circulation of combustion gases in the means of filtration, without causing a constriction of these means.

A second aspect of the invention concerns an assembly process for a gas generator according to the first aspect of the invention, including an ignition device and in which the housing is formed of a base and a diffuser with the diffusion holes. The assembly process includes the steps which involve:
securing the ignition device to the base,
loading the pyrotechnic substance, for example by gravity, into the base in contact with the ignition device, through a base load opening,
positioning the means of drainage between the pyrotechnic substance and the base load opening,
positioning the means of containment above the means of drainage and in the area of the load opening,
positioning the means of filtration onto the means of containment,
welding the diffuser to the chamber in such a way that the means of filtration are inserted between the means of containment and a wall of the diffuser and so as to block the load opening with the means of containment.

DETAILED DESCRIPTION OF THE DRAWINGS

Figure 2:
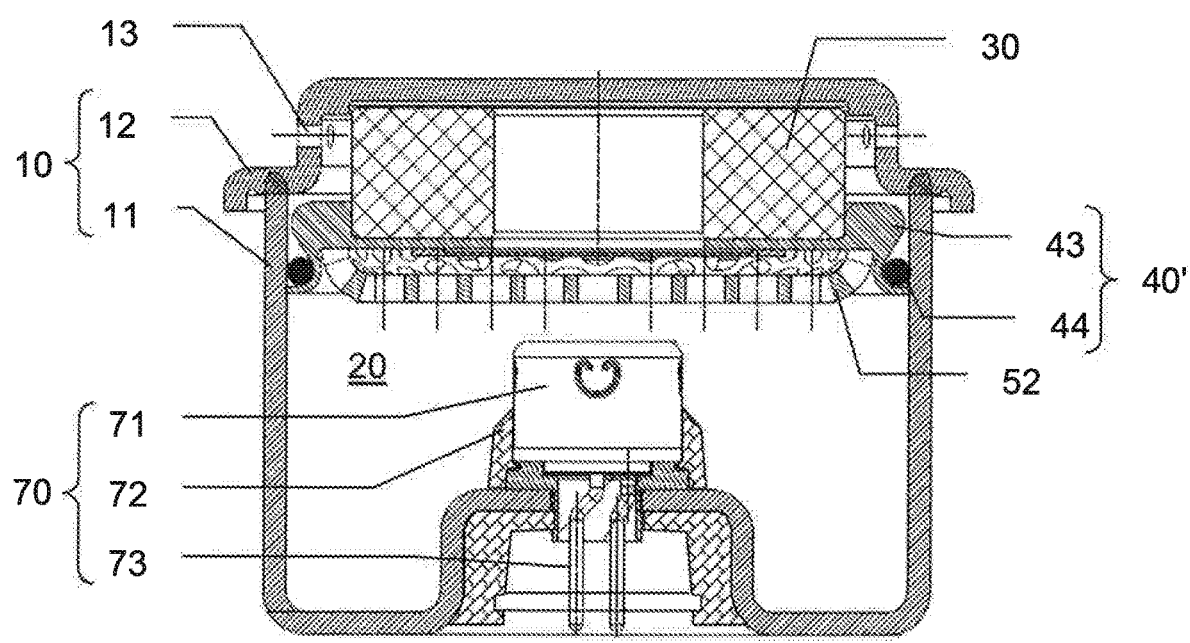
Figure 3:
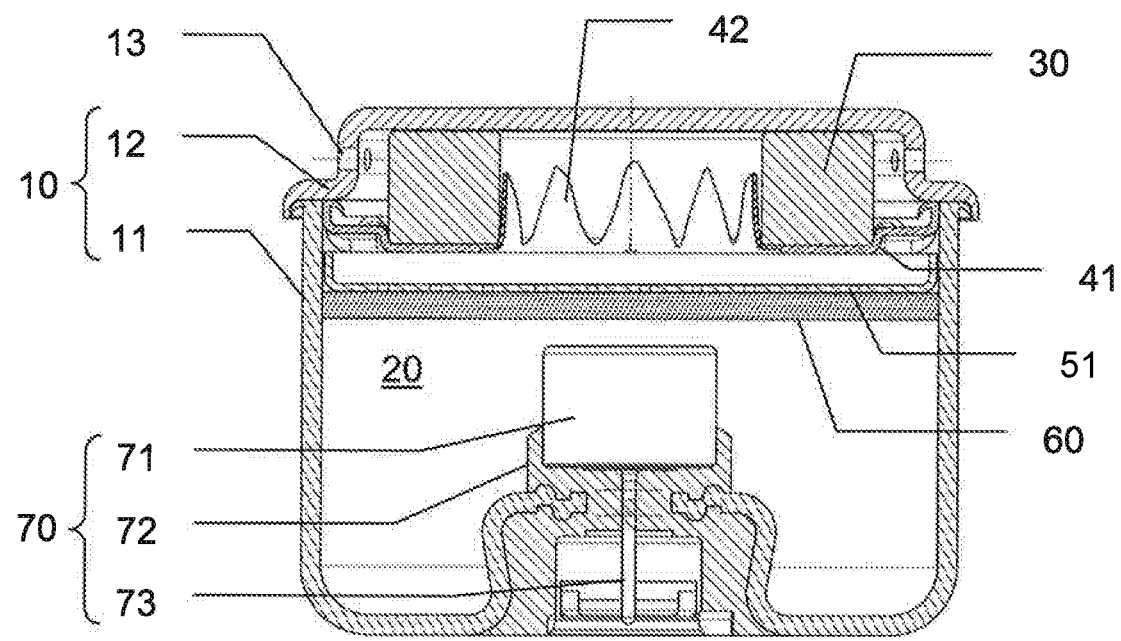

Other characteristics and advantages of this invention will appear more clearly when reading the following detailed description of two embodiments of the invention provided as examples, which are in no way restrictive, and illustrated by the appended designs, in which:

FIG. 1 presents a cross-section of a first embodiment of a gas generator according to this invention, before its operation;

FIG. 2 presents a cross-section of a second embodiment of a gas generator according to this invention, before its operation;

FIG. 3 presented the gas generator from FIG. 1 after its operation.

DETAILED DESCRIPTION

FIG. 1 presents a gas generator including housing 10 formed from a base 11 inertially welded to a diffuser 12, which includes multiple diffusion holes 13.

Inside the housing 10, pyrotechnic substance 20 is placed around an ignition device 70 consisting of a case 71 containing ignition pyrotechnic substance, overmolding 72, and connection pins 73 to receive an electrical ignition signal. In other words, the ignition device 70 here is an electric pyrotechnic igniter.

Means of immobilization 60 (for example a foam wall) and means of drainage such as a perforated metal sheet 51 are placed in the base 11 above the pyrotechnic substance 20. The means of drainage can also be created from metal mesh or compacted wire and shaped appropriately to mold to the internal diameter of the base 11. The function of the means of drainage is to retain, upstream of the means of filtration 30, the pyrotechnic substance during its combustion. This allows the combustion of the pyrotechnic substance to be controlled during combustion. In fact, movement of the pyrotechnic substance to come into contact with the filter would partially block the filter, which would restrict the flow of gas and result in an increase in pressure in the gas generator. This is not desirable in a generator for front applications with a diameter generally greater than 40 mm. For generators of this diameter, their resistance to pressure requires increases in wall thickness that represent too great a disadvantage for the total mass of the generator.

The pyrotechnic substance 20 is a loose load of propellant tablets, but a single block of propellant can be envisaged.

The means of filtration 30 are arranged in the diffuser 12, and a seal 41 is welded to the diffuser 12 in the same area as the base 11, in inertia welding zone S. As a result, the seal 41 and the inertia welding zone S form means of containment 40 for the pyrotechnic substance 20: this substance is separated or isolated from the diffusion holes 13 in a leak-proof manner, because the seal 41 is a metal disc directly welded onto the diffuser 12.

Typically, the means of filtration 30 are a filter made from perforated sheet metal, wound around itself, or a shaped compacted wire, or a compacted metal mesh. As can be seen in FIG. 1, the means of filtration 30 have a general toric shape, with an internal diameter D1 and an external diameter D2, inserted into a counterbore of the seal 41 so that they are correctly positioned in relation to the latter, thus guaranteeing the final positioning of the means of filtration in relation to the diffuser 12.

During the gas generator's operation, it is therefore necessary for the seal 41 to rupture in order to release the combustion gases from the pyrotechnic substance 20 so that they flow through the means of filtration 30 and are diffused by the diffusion holes 13 before inflating an airbag.

For this purpose, the seal 41 has a portion supported by the means of filtration, and a non-supported portion at the internal diameter D1.

Typically, the seal 41 has a thickness in the non-supported portion within a range from 0.4 to 0.8 mm with for example at least a marked portion notably cross-shaped with a remaining thickness equal to 0.3±0.05 mm. The following mechanical characteristics can be envisaged: breaking strength (Rm) within a range from 300 MPa to 800 MPa, and/or elongation at break (A %) greater than or equal to 16%, and/or an elastic strength (Re) greater than or equal to 420 MPa. A steel of the type S420MC (1.0980) (standard EN 10149-2-1996) can be envisaged.

Consequently, after a phase in which the pyrotechnic substance 20 is ignited by the ignition device 70, the pressure increases in the compartment of the housing 10 containing the pyrotechnic substance 20 and which is closed by the seal 41, until it causes the latter to rupture, in the non-supported portion, as can be seen in FIG. 3.

In fact, FIG. 3 shows that the seal 41 has ruptured, forming petals 42 in the area of diameter D1 of the means of filtration 30. The rupture of the seal 41 is controlled, because the means of filtration 30 force its opening in the area of diameter D1, with the support provided to the supported portion of the seal 41 (the stress upon the seal 41 is directly dependent on the pressure, but also on the value of diameter D1). Diameter D1 also avoids the tear of the petals 42 from spreading.

Furthermore, the rupturing kinematics is determined, with a folding or rolling of the petals 42 around the lower edge of the internal diameter of the means of filtration 30.

The support provided by the means of filtration 30 therefore dictates the value of the unsealing pressure, and the rupturing kinematics, which allows repeatable and reliable ignition, and the absence of loose debris. In fact, the petals 42 remain attached to the seal 41.

The means of filtration 30, sandwiched between the seal 41 and the internal upper surface of the diffuser 12, form a mechanical bridge to provide support to the means of containment (the seal 41) and avoiding requiring a thick metal sheet. Furthermore, during operation, the pressure of the combustion gases continuously pushes the seal 41 against the means of filtration 30 and against the internal upper surface of the diffuser 12, which forces the combustion gases to flow through the means of filtration 30, and not between these means and the diffuser 12 or the seal 41.

Finally, it should be noted that a void is established between the means of filtration 30 and the diffuser 12, in particular in the area of the diffusion holes 13. This arrangement helps ensure that the diffusion holes 13 are never obstructed, even partially, by the means of filtration 30 and that all diffuse an equivalent flow of gas. There is no imbalance in the flow rate, which explains the canceling out of thrust and the lack of movement if the gas generator is ignited alone without being held in place.

Typically, the gas generator according to this invention is used in front safety modules (integrated into a vehicle steering wheel or a dashboard to protect an occupant in the event of a head-on impact). The load of pyrotechnic substance 20 can be in the form of tablets with a diameter of 6.35 mm, and a thickness of between 1.5 mm and 3 mm. The pyrotechnic substance can have a burning rate of approximately 21 mm/s at 20 MPa (and in any case at a pressure lower than 25 MPa). In these conditions, the combustion pressure Pcomb measured in the base 11 is not much higher than the diffusion pressure Pdiff measured in the internal diameter D1 of the filter 30.

This result is obtained thanks to the low height of the load of tablets in comparison to the internal diameter of the base 11 (the combustion gases do not have to flow through a thick bed of tablets), and also thanks to the internal diameter D1 of the filter 30 which allows a significant flow of gas.

The applicant has measured and found that the ratio Pcomb/Pdiff is less than 1.5, at least in the following configurations:

|  | Example 1 | Example 2 | Example 3 |
|---|---|---|---|
| Height of load | Between 23 mm and 28 mm | Between 26 mm and 30 mm | Between 37 mm and 40 mm |
| Internal diameter of the base 11 | 47 ± 1 mm | 50 ± 1 mm | 57 ± 1 mm |
| Internal diameter of the filter 30 | 18 ± 2 mm | 20 ± 2 mm | 24 ± 2 mm |
| Thickness of the filter 30 | 10 ± 2 mm | 12 ± 2 mm | 16 ± 2 mm |
| Number of diffusion holes | 20 to 24 | 20 | 30 |
| Ø of the diffusion holes | 1.7 mm | 2.2 mm to 2.4 mm | 2.9 mm |
| Equivalent diffusion area | 45.4 mm$^2$ to 54.5 mm$^2$ | 76 mm$^2$ to 90 mm$^2$ | 198 mm$^2$ |

The gas generator according to this invention therefore has a uniform pressure between the base 11 and the inside of the filter 30, which limits the internal forces (as there are minimal pressure differences).

FIG. 2 presents a second implementation of a gas generator according to the invention. In the same manner as for the first implementation, the housing 10 is formed by the base 11 welded to the diffuser 12 through inertia welding. However, the means of containment 40' here include a seal 43 and a gasket 44 installed in the base 11 to ensure a leak-proof barrier between the diffusion holes 13 and the pyrotechnic substance 20. The seal 43 can be formed from two parts, as presented, glued or welded together or from one single part.

Finally, the means of drainage here include a perforated metal sheet 52 which is thicker than in the first implementation.

In the same manner as for the first embodiment, the means of filtration are sandwiched between the diffuser 12 and the seal 43 to provide support to the latter. Consequently, the non-supported part of the seal 43 can open repeatably in the internal diameter of the means of filtration 30, at a repeatable pressure and repeatable time, without losing any fragments.

The manufacturing process of the generator under the first or second implementation is almost identical: the base 11 fitted with the ignition device 70 with its upper opening (which will be welded to the diffuser 12 at the end of manufacturing) is placed under a device for loading the propellant tablets. As a result, the propellant tablets can be dropped by gravity into the base 11, through the opening of base 11 so as to fill the base 11 with the pyrotechnic substance 20. The loose propellant tablets are therefore arranged around, and possibly over, the ignition device 70.

Once the propellant tablets have been loaded into the base, the means of immobilization 60, the means of drainage and the means of containment may be successively placed into the base in this order. The means of filtration 30 are then positioned onto the means of containment, and the diffuser 12 is then welded.

In the case of the first implementation, the seal 41 is intended to have means of fitting with the base 11 so that it is attached at least when rotating, so that the inertia welding (or friction welding) between the base 11, the diffuser 12 and the seal 41 occurs at the same time.

It is understood that this manufacturing process does not require any prior preparation of the propellant tablets into a subassembly (for example a case containing the tablets) manufactured away from the production line and placed into the base 11. Rather, the loose propellant tablets can be placed directly into the base 11, in contract with the side walls of the latter, and in contact with the ignition device 70. Consequently, the manufacturing process is simple, the gas generator does not include a container specifically for the tablets and its volume is reduced as far as possible because no space has been left between the tablets and the ignition device.

It is understood that various modifications and/or improvements, obvious to a person skilled in the art, may be made to the invention's different embodiments described in this description without going beyond the scope of the invention defined by the appended claims. In particular, reference is made to an ignition device 70 which is an igniter on its own, but it is possible to envisage using a pyrotechnic relay between the igniter and the pyrotechnic substance 20. Furthermore, it should be noted that the means of drainage can be made from metal mesh or from compacted wire, which gives them a function of capturing combustion heat during operation, and maintaining this heat far away from the gas generator's external walls, which can be in contact with plastics, and so these plastics will be less exposed to heat.

The invention claimed is:

1. A disc-shaped pyrotechnic gas generator, comprising:
a housing including a plurality of diffusion holes;
a pyrotechnic substance arranged in the housing;
a filter arranged in the housing, the filter having a central void;
a containment member arranged in the housing between the pyrotechnic substance and the filter, the containment member configured to rupture by forming at least one petal extending into the central void of the filter; and
wherein the containment member is a metal disk radially extending beyond the filter and unitarily formed to include a supported portion axially adjacent the filter and supporting the filter and a non-supported portion axially adjacent the central void of the filter, the non-supported portion configured to rupture to form the at least one petal extending into the central void of the filter,
wherein the containment member defines a centering receptacle for centering the filter axially within the housing, and
wherein the containment member further includes a radially extending flange axially spaced from the supported portion and interconnected to the supported portion by an axially extending portion, the axially extending portion being radially adjacent to the filter.

2. The gas generator of claim 1, wherein the housing includes a base having an open axial end and a diffuser secured to the base at the open axial end, the diffuser defining the plurality of diffusion holes, the containment member entirely disposed within the base in an axial direction.

3. The gas generator of claim 2,
wherein the containment member is directly welded to the diffuser.

4. The gas generator of claim 2, wherein the containment member is connected to the diffuser and the base of the housing at an inertia welding zone.

5. The gas generator of claim 4, wherein an upper axial end of the base and the containment member abut a radially extending portion of the diffuser in the inertia welding zone.

6. A method of assembling the gas generator according to claim 2, wherein the gas generator includes an ignition device, the method comprising:
securing the ignition device to the base;
loading the pyrotechnic substance by gravity into the base in contact with the ignition device through a base load opening;
positioning a drainage member between the pyrotechnic substance and the base load opening;
positioning the containment member above the drainage member and in an area of the base load opening;
positioning the filter onto the containment member; and
welding the diffuser to the base such that the filter is inserted between the containment member and a wall of the diffuser to block the base load opening with the containment member.

7. The gas generator of claim 1, wherein the pyrotechnic substance is a loose load of tablets around an ignition device of the gas generator.

8. The gas generator of claim 1, wherein the containment member is connected to a diffuser and a base of the housing at an inertia welding zone.

9. The gas generator of claim 8, wherein an upper axial end of the base and the containment member abut a radially extending portion of the diffuser in the inertia welding zone.

10. The gas generator according to claim 1, wherein the plurality of diffusion holes form nozzles for controlling combustion of the pyrotechnic substance.

11. The gas generator according to claim 1, wherein a space is established between the filter and the plurality of diffusion holes.

12. The gas generator according to claim 11, wherein the space is established between a downstream surface of the filter and a wall of the housing penetrated by the plurality of diffusion holes and has a thickness in an area of the plurality of diffusion holes of at least 1 mm.

13. The gas generator according to claim 1, further comprising a drainage member arranged in the housing between the pyrotechnic substance and the containment member and an ignition device disposed in the housing and axially spaced from the drainage member.

14. The gas generator according to claim 1, wherein the housing includes a cover and a main body portion, the filter radially extending below the cover and captured between the cover and the containment member.

15. The gas generator according to claim 1, wherein the housing includes a cover and a main body portion, the containment member including an axially extending flange at an outer circumference thereof, the axially extending flange directly opposed in an axial direction by the cover.

16. The gas generator of claim 1, wherein the housing includes:
- a base on a first axial side of the containment member; and
- a diffuser on a second, opposite axial side of the containment member, the containment member welded directly to the diffuser in a leak-proof manner,
- wherein the filter is axially captured between the diffuser and the containment member.

* * * * *